United States Patent [19]
McConnell

[11] 3,783,269
[45] Jan. 1, 1974

[54] AUTOMATIC FOCUS POSITIONING CIRCUIT

[75] Inventor: Robert G. McConnell, Englewood, Colo.

[73] Assignee: Honeywell Inc., Minneapolis, Minn.

[22] Filed: June 5, 1972

[21] Appl. No.: 259,788

[52] U.S. Cl.................. 250/201, 250/235, 356/125
[51] Int. Cl............................ G01j 1/20, G01b 9/00
[58] Field of Search............................ 356/125, 122; 250/201, 204, 235

[56] References Cited
UNITED STATES PATENTS

| 3,450,883 | 6/1969 | Thomas | 250/204 |
| 3,599,552 | 8/1971 | Harvey | 250/201 |
| 3,418,477 | 12/1968 | Knutrud et al | 250/201 |

Primary Examiner—John K. Corbin
Assistant Examiner—V. P. McGraw
Attorney—Arthur H. Swanson et al.

[57] ABSTRACT

An automatic focusing apparatus includes a lens means which is driven back and forth between two extreme positions. A wobbulating mirror reflects radiations passing through the lens means, to a multi-apertured mask, positioned at a predetermined plane, at which an image of a scene is to be formed. A light detector responds to radiations passing through the apertures in the mask to effect the generation of a signal which varies with the degree of sharpness of the image. A memory device stores a representation of the position of the lens means at which the image appeared in focus during a first movement of the lens means between the extreme positions, and thereafter effects the termination of movement of the lens means at that in-focus position during a second movement between the extreme positions.

8 Claims, 5 Drawing Figures

3,783,269

AUTOMATIC FOCUS POSITIONING CIRCUIT

The present invention relates generally to optical focusing systems, and more particularly to the automatic focusing of a lens system.

Subject matter disclosed but not claimed herein, is disclosed and claimed in a copending application of Norman L. Stauffer, Ser. No. 259,787 filed on even date herewith.

In many prior art focusing systems, the in-focus position of a lens means is determined by monitoring contrast changes or sharpness of a projected image with a light detection device, then generating a detection signal which varies in accordance with the contrast changes of a portion of the image being monitored. An in-focus signal is then generated when a peak occurs in the detection signal. For example, a light responsive Wheatstone bridge circuit has been used to determine the in-focus position of a lens means as the position at which the unbalance current generated thereby ceases to increase. While such prior art systems are generally satisfactory, they are subject to a disadvantage in that an in-focus signal may be generated upon the occurrence of a noise peak in the detection signal which would cause a false indication of a correct focus position of the lens means. Moreover, while such systems may be satisfactorily applied to slide projector systems, they are generally unsuitable for use with camera or similar systems for several reasons. For example, in a projector system, the focus position of a lens means generally changes only slightly, if at all, from one slide to the next. Therefore, the correct focus position of a lens means for any one slide may be indicated by slightly moving the lens means position and detecting the first peak value of the detection signal from the prior position of the lens means at which the previous slide was in focus. However, in a camera system, scenes to be photographed will vary greatly in focal distance from one scene to the next; therefore, while the nearest peak in a detection signal may properly indicate an in-focus position of a lens means in the camera with respect to a small portion of the scene being photographed, it does not necessarily represent the position of the lens means at which the major portion or a selected portion of the scene is in focus. Thus, some prior art systems are subject to the disadvantage that improperly generated in-focus signals are provided when, in fact, only a small portion of the scene is properly focused or, as in the case of a noise peak, no portions of the scene is in focus.

It is accordingly an object of the present invention to provide an automatic focusing apparatus which obviates the disadvantages of prior art systems.

It is another object of the present invention to provide an automatic focusing system which is relatively insensitive to small noise peaks in a detection signal thereby providing a more accurate indication of the focus position of the lens means.

It is a further object of the present invention to provide an automatic focusing system as set forth which indicates the position of the lens means at which the major portion of an image is in focus.

In accomplishing these and other objects, there has been provided, in accordance with the present invention, an improved automatic focusing system wherein a lens means initially accomplishes a first movement from a first position to a second position, thereby varying the degree of sharpness of a projection formed on a predetermined plane from radiations passing through the lens means from an external scene. A scanning means scans the image at a uniform rate and provides a focus signal representative of the degree of sharpness of the image attained during the first movement of the lens means. A signal responsive means responds to the focus signal to stop the lens means during a subsequent return movement of the lens means toward the first position, at the position wherein the maximum degree of sharpness had been detected.

A better understanding of the present invention may be had from the following detailed description, when read in connection with the accompanying drawings, in which.

Figure 1:
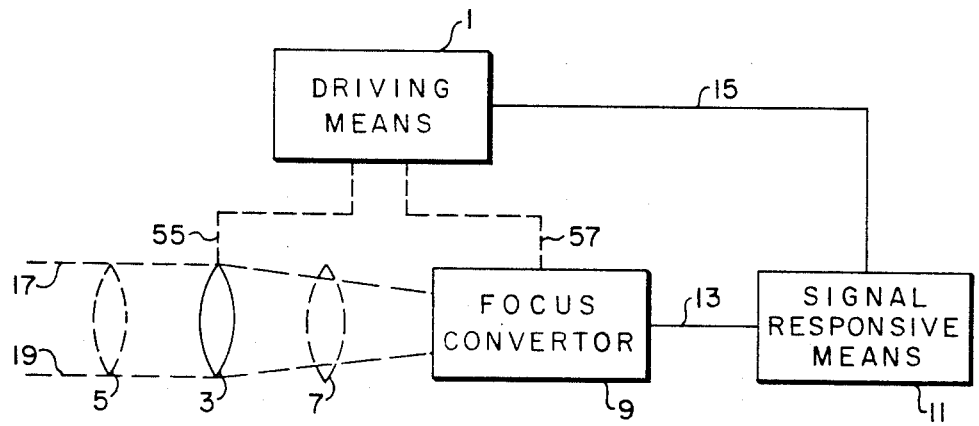
FIG. 1 is a general schematic diagram of the automatic focusing system of the present invention.

Referring to the drawings in detail, FIG. 1 shows a driving means 1 arranged to drive a lens means 3 through a first coupling means as indicated by the dashed line 55. The lens means 3 is driven between a first position 5 and a second position 7. The driving means 1 is also coupled to a Focus Converter means 9 by a second coupling means indicated by the dashed line 57. For simplicity, a single lens is shown as comprising the lens means 3, it being understood that a more sophisticated lens system may easily be substituted for the single lens. Radiations from a scene pass through the lens means 3 and fall upon the Focus Convertor means 9. The Focus Convertor means 9 is connected to a signal responsive means 11 by a connection 13. The signal responsive means 11 is connected to Driving means 1 through a connection 15. The signal responsive means 11 responds to an output signal of the focus Convertor means 9 to effect the termination of movement of the lens means 3 at a position whereat a projected image of an external scene is in focus as is hereinafter explained.

The first coupling means indicated by the dashed line 55 may take many forms such as a rack and pinion wherein a rotating shaft operated by the driving means rotates a pinion which in turn drives a rack upon which the lens means 3 is mounted. Such coupling means are well known in the art and a further explanation at this point is deemed unnecessary.

Figure 2:
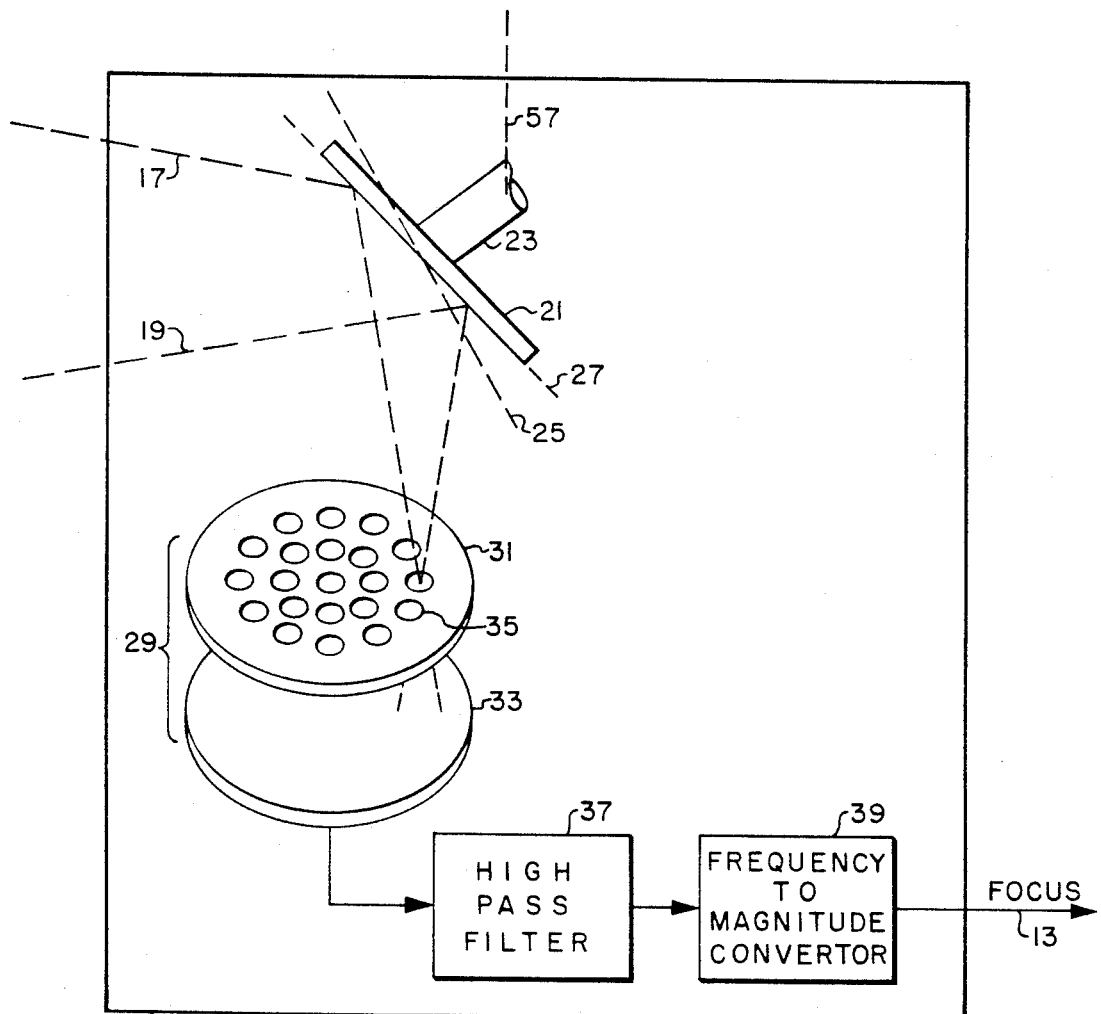
FIG. 2 is a schematic diagram of a Focus Converter Means shown in FIG. 1.

FIG. 2 shows the structural details of the Focus Convertor means 9 of FIG. 1. Radiations, represented by rays or lines 17 and 19, emanating from a single point source of a distant scene or object, pass through the lens means, represented by the lens 3 of FIG. 1, to a rotating mirror 21. The mirror 21 is driven in a wobbulatory manner by a shaft 23 which is in turn coupled to the driving means 1 of FIG. 1 by a second coupling means indicated by the dashed line 57. The shaft 23, and mirror 21 comprise a deflection means for reflecting the radiations 17 and 19 in a predetermined manner as hereinafter explained. The wobbulation of the mirror 21 is caused by its non-perpendicular or angularly offset alignments with respect to the axis of the shaft 23. As the mirror 21 rotates, its reflective surface will traverse, between limit planes 25 and 27, which are shown in phantom. While the mirror 21 moves between limit planes 25 and 27 as it is rotated by the shaft 23, the radiations 17 and 19 are reflected toward a detection means 29 comprising a mask 31 and a light responsive device 33. As the mirror 21 wobbulates, the radiations from the scene being viewed traverses the mask 31 in a circular pattern. The uniform circular scanning by the radiations 17 and 19 over the mask 31 may also be acccomplished by other deflection means, such as a rotating off-center focus lens or a rotating prism in front of or combined with the lens means 3. The mask 31 in the present example has a plurality of apertures 35 therein, which apertures may be arranged in a random pattern. Light passing through the apertures 34 will fall on the light responsive device 33. The mask 31 and the light responsive device 33, which together comprise the detection means 29, detect the contrast definition of an image formed at the plane of the mask 31 as is hereinafter explained. The mask 31 and the light responsive device 33 are shown separately in the drawing for the sake of clarity but may be advantageously joined together to form one member. The light responsive device 33 is connected to a high pass filter 37, which is, in turn, connected to a frequency-to-magnitude converter 39. The filter 37 and converter 39 together comprise a signal conditioning means. The output of the converter 39 is applied through the connection 13 to the signal responsive means 11 shown in FIG 1.

Figure 4:
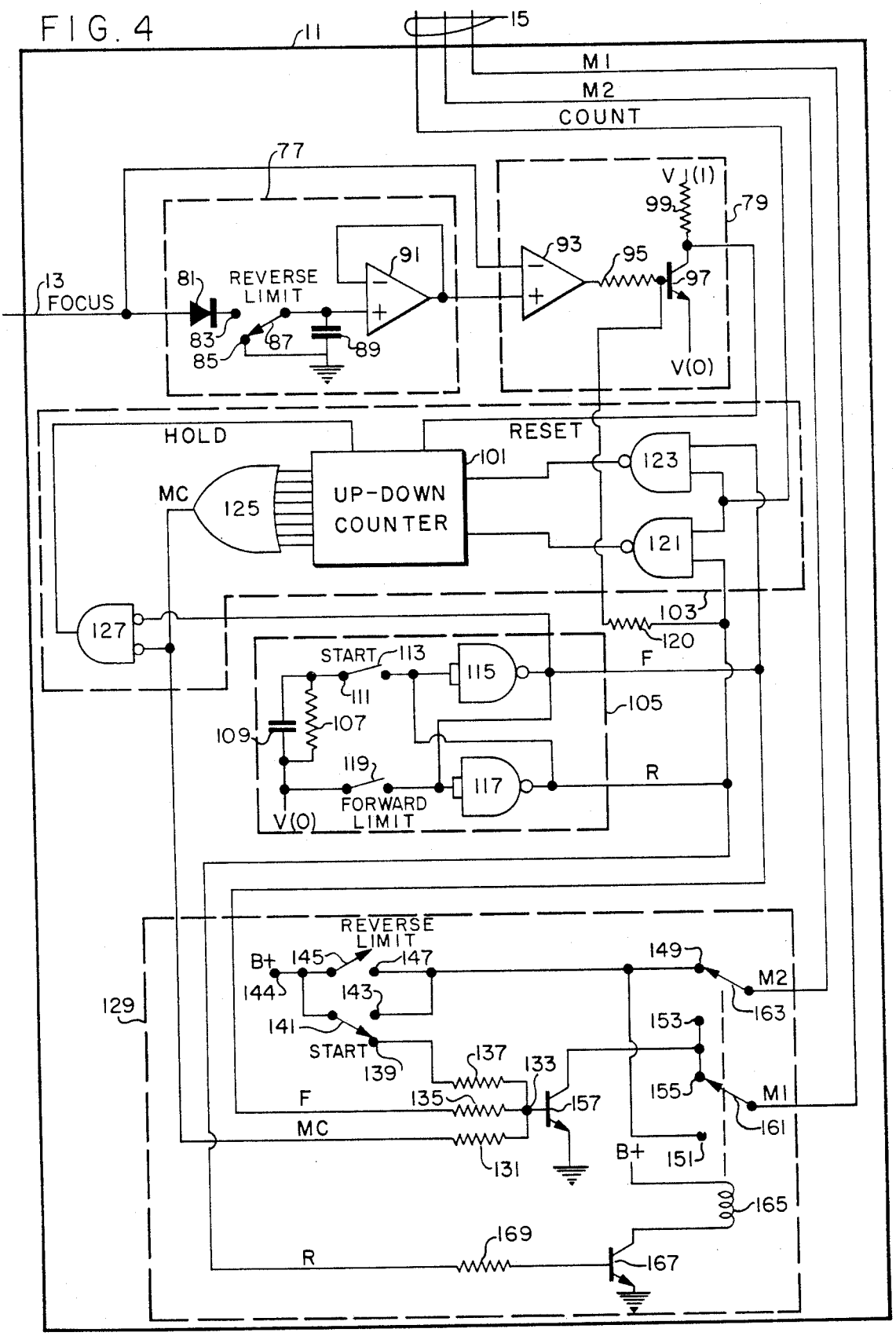
FIG. 4 is a schematic diagram of one embodiment of a Signal Responsive Means shown in FIG. 1.
Figure 5:
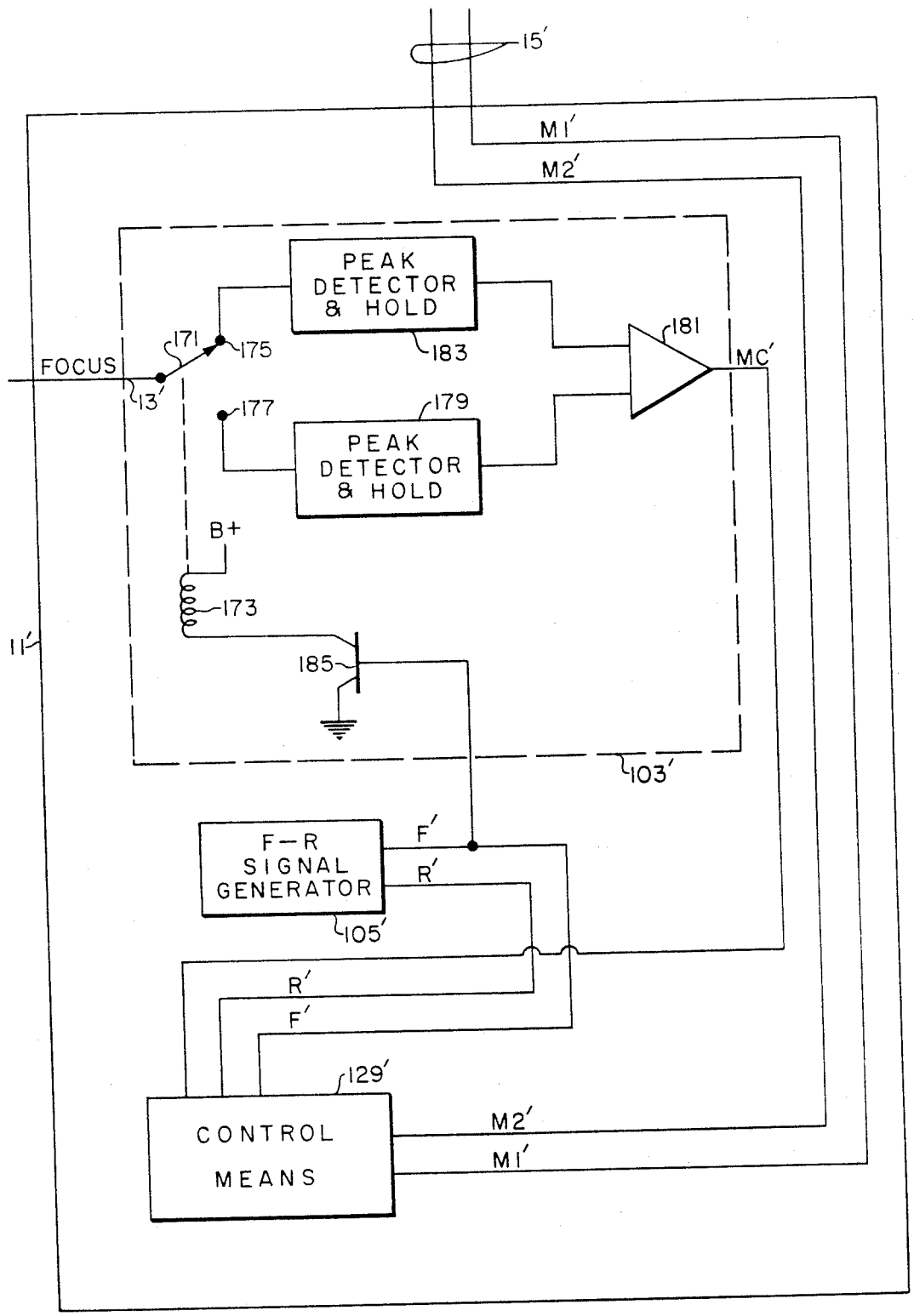
FIG. 5 is a schematic diagram of another embodiment of the Signal Responsive Means shown in FIG. 1.

The operational goal of the combination illustrated in FIG. 2 is to provide an electrical signal representative the degree of sharpness exhibited by the image formed at the surface plane of the detection means 29, or more specifically, the surface of the mask member 31 of the detection means 29, as the lens means 3 moves between positions 5 and 7. Any scenes may be said to comprised of a number of point sources of light, each point source of the scene emitting rays of light in all directions. Referring to the figure, two rays of light, 17 and 19 coming from a single distant point source of a scene being viewed, pass through the lens 3. As the two rays from the single point source pass through the lens 3, they are refracted toward each other and begin to converge. Where those two rays converge, which is, desirably, at the image plane or surface of the mask 31, an image of that point source is formed. Using the same approach, it is apparent that when the lens 3 is in a proper focus position, all of the light rays emanating from the individual point sources of a scene lying substantially in the same relative plane with respect to the plane of the lens 3, will be clearly defined at the image plane, at the points of their respective convergence; and therefore, an "in focus" image of the scene will be formed on the plane of the mask 31 in the present example. That "in focus" image will be characterized by clearly defined contrast changes, as compared with the gradual or diffused contrast changes of an unfocused image. In the present embodiment, the wobbulating mirror 21 rotates at a much faster rate than the rate of traversal of the lens means 3 from the position 5 to the position 7. The mirror 21 effects the uniform circular scanning of an image formed at the mask 31 over the apertures 35 therein. If the lens 3 is not in a proper focus position, the image formed at the mask 31 will not be in focus. As that unfocused image traverses the apertures 34 in the mask 31, only relatively gradual light changes will be detected by the light reponsive device 33; and therefore, the data signal generated by the light detection means 29 will rise and fall only gradually. On the other hand, when the lens 3 is in a proper focus position, the image formed at the mask 31 will be in focus and exhibit sharply defined contrast changes. As the sharply defined or focused image is uniformly moved across the apertures 35 in the mask 31, the sharply defined contrast changes will effect abrupt changes in the data signal generated by the detection means 29, as the edges of the apertures 35 of the mask 31 are traversed. Those abrupt changes in the data signal are evidenced by an increase in the high frequency components thereof. The high pass filter 37 passes only those high frequency components above a predetermined value; the frequency-to-magnitude converter 39 converts the filtered data signal appearing at its input, into a signal which varies in magnitude with the amplitude and value of the high frequency components present in the frequency distribution of the data signal. Therefore, the frequency-to-magnitude converter 39 provides a "Focus" signal which varies in magnitude with the definition of the contrast changes of the image appearing on the image plane, or in the present example, the mask 31. In applying the automatic focusing system of the present invention, to a camera system, it will be appreciated that for every new scene to be photographed, the lens means 3 must be moved from an outer focus limit stop or first position to an inner focus limit stop or second position in order to ascertain the proper focus position of the lens means 3 with respect to the particular scene to be photographed. After the lens means 3 has been moved from the first position 5 to the second position 7, it is returned to the position whereat the image on the mask 31 appeared in sharpest contrast. The signal responsive means 11 is provided to accomplish that result. FIGS. 4 and 5 show arrangements which accomplish the function of the signal responsive means 11.

Figure 3:
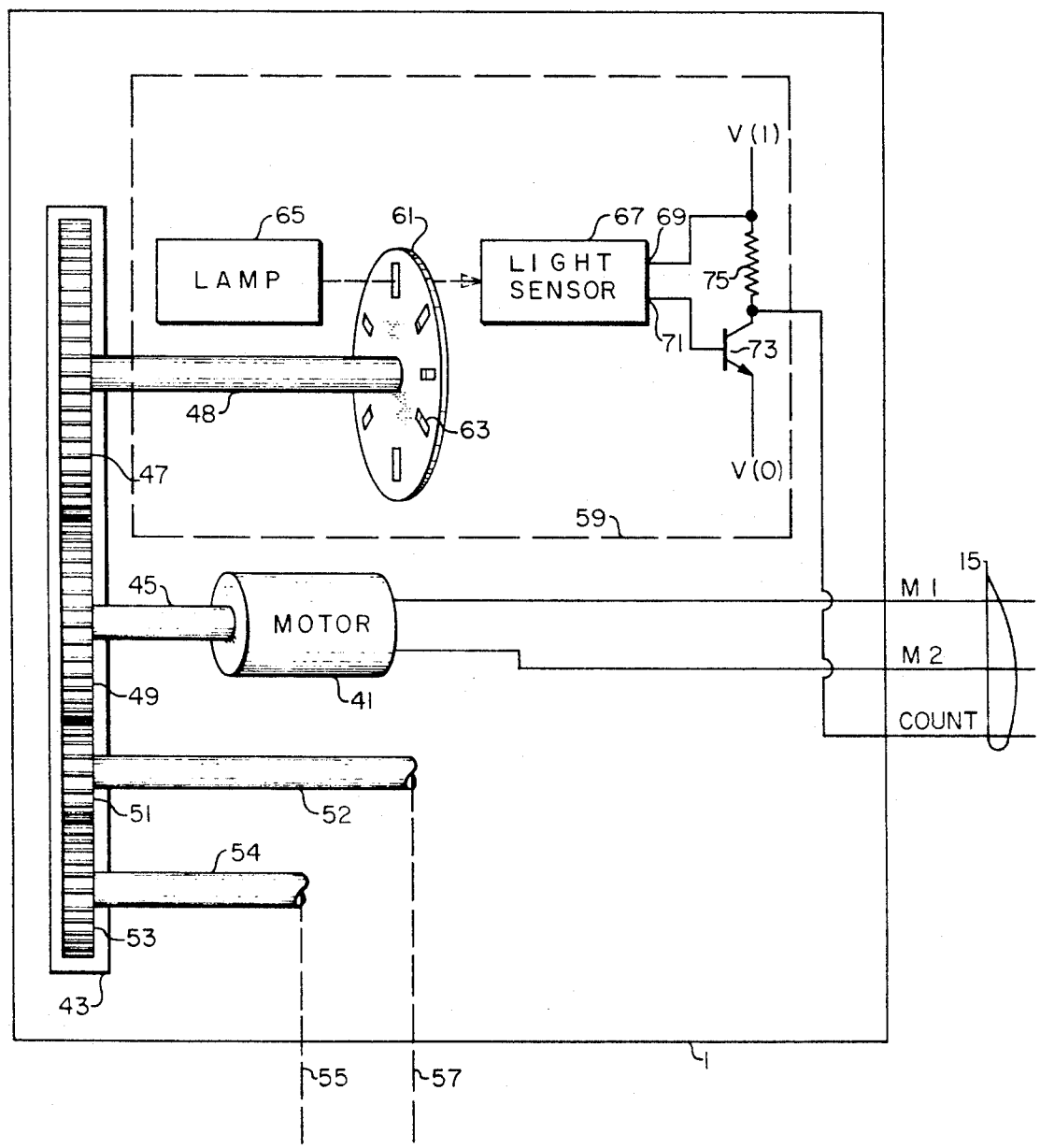
FIG. 3 is a schematic diagram of one embodiment of a driving means shown in FIG. 1.

FIG 3 shows the driving means 1 with two motor leads M1 and M2 connected to a motor or driving device 41. The motor 41 is coupled to a gear box 43 by a motor shaft 45. The gear box 43 is shown schematically in FIG. 3 as comprising four gears 47, 49, 51 and 53. The gear 53 and shaft 54 represent a first coupling means for coupling the driving device or motor 41 to the lens means 3 as indicated by the dashed line 55. The shaft 54 may, for example, be coupled to a rack and pinion type drive as hereinbefore noted, which, in turn, drives the lens means 3 between the first and second position 5 and 7. The gear 51 and shaft 52 represent a second coupling means which couples the motor 41 to the deflection means or shaft 23 and mirror 21 as indicated by the dashed line 57. The gear 47 and shaft 48 represent a third coupling means for coupling the driving device 41 to a count signal generating means 59.

More specifically, the gear 47 drive a circular disc 61 which has gating apertures 63 spaced around the periphery thereof. The circular disc 61 is so positioned between a lamp or light producing means 65 and a light sensor 67 that light from the lamp 65 is allowed to pass through the gating apertures 63 of the disc 61 to the light sensor 67 as the disc 61 is rotated. The light sensor 67 in the present example exhibits a very low resistance across its output terminals 69 and 71 when light from the lens 65 impinges thereon. The output terminal 71 of the light sensor 67 is connected to the base terminal of a transistor 73. The emitter terminal of the transistor 73 is connected to a potential representative of a logic zero level as indicated by V(0). The collector terminal of the transistor 73 is connected to a resistor 75 which is, in turn, connected to the other output terminal 69 of the light sensor 67 and a voltage representative of a logik 1 as indicated by V(1). In the present example, a logic 1 is 5 volts and a logic 0 is zero volts or ground. The collector terminal of the transistor 73 provides a "Count" signal at one output of the driving means 1. When the motor 41 is energized through the leads M1 and M2, the lens means 3 is driven through the first coupling means and the mirror 21 is driven through the second coupling means. While the motor 41 is energized, the disc 61 will rotate, thereby presenting, alternately, areas of opacity and transparency in the light path from the lamp 65 to the light sensor 67. When the disc 61 blocks the light from the lamp 65 from falling on the light sensor 67, a high resistance will appear across the terminals 69 and 71 of the light sensor 67 and the transistor 73 will be non-conducting. When the transistor 73 is non-conducting a logic 1 or voltage representative of a logic 1, will appear at the collector terminal of the transistor 73 and the Count signal will be at a logic 1 or high level. When one of the gating apertures 63 allows light to pass from the lamp 65 to the light sensor 67, the resistance across the terminal 69 and 71 of the light sensor 67 will become relatively low thereby allowing a higher valued current to flow therethrough which is sufficient to render the transistor 73 conductive. When the transistor 73 becomes conductive, the resistance of the collector to emitter path of the transistor 73 becomes very small thereby effectively connecting the collector terminal of the transistor 73 to a logic 0 potential. The collector terminal of the transistor 73 will then assume a logic 0 voltage, i.e., the Count signal will go "low." Thereafter, when an opaque area of the disc 61 again blocks the transmission of the light from the lamp 65 to the light sensor 67, the transistor will revert to its non-conducting state and Count output will go from a logic 0 to a logic 1. Therefore, whenever the motor 41 is energized through the leads M1 and M2, regardless of direction, a count signal in the form of a train of pulses, will appear at the Count output of the driving means 1. The frequency of the individual pulses of the Count signal will vary directly with the speed of the motor 41. Therefore, the Count output of the driving means 1 provides a signal which is representative of the number of rotations of the motor 41 which is, in turn, related to the distance traversed by the lens means 3, during any given time period. The M1, M2, and Count outputs of the driving means 1 comprise the connection 15 shown in FIG. 1.

FIG. 4 shows the signal responsive means 11. The Focus signal from the focus converter means 9 is applied through the connection 13, and the M1, M2 and Count signals from the driving means 1 are applied through the connection 15 (FIG. 1). The Focus signal is applied to a peak detector circuit 77 and a comparator circuit 79. Within the peak detector circuit 77, the Focus signal is applied to the anode terminal of a diode 81. The cathode terminal of the diode 81 is connected to a fixed contact 83 of a switch 87. Another fixed contact 85 of the switch 87 is connected to ground. The switch 87 is arranged to selectively move between the two terminals 83 and 85. The movable member of the switch 87 is connected through a capacitor 89 to ground and also to one input terminal of a two input amplifier 91. The single output terminal of the amplifier 91 is connected in feedback configuration to the second input terminal of the amplifier 91. The output signal of the amplifier 91 represents the output signal of the detector 77. That output signal is fed into the comparator 79 along with the Focus signal from the focus converter means 9. The Focus signal and the peak detector output signal are applied, respectively, to the input terminals of an amplifier 93 in the comparator 79. The outputs of the amplifier 93 is connected to a resistor 95 which is, in turn, connected to the base terminal of the transistor 97. The emitter terminal of the transistor 97 is connected to a logic 0 voltage source; the collector of the transistor 97 is connected through a resistor 99 to a logic 1 voltage source. The output of the comparator 79 is taken from the collector terminal of transistor 97 and provides a "Reset" signal. The Reset signal is applied to an up-down counter 101 included within a memory means 103. A direction signal generating means 105 includes a resistor 107 and a capacitor 109 connected in parallel between a logic 0 voltage source and a terminal 111. A switching member 113 is selectively operable to provide a connection between the terminal 111 and the input terminals of a NAND gate 115. NAND gates such as gate 115 are well known in the art and function to provide a logic 0 signal at its output terminal when logic 1 signals are applied concurrently to its input terminals. When logic 1 signals are not concurrently applied to its input terminals, a NAND gate will provide a logic 1 signal at its output terminal. The input terminals of the gate 115 are connected to the output terminal of another gate 117. A switch 119 operates to provide a connection between a logic zero voltage and the input terminals of the gate 117. The input terminals of the gate 117 are also connected to the output terminal of the gate 118. Gate 115 provides a first direction signal or Forward output signal "F," and the gate 117 provides a second direction signal or Reverse output signal "R." The Reverse signal R is applied to one input of a gate 121 within the memory means 103, and to the base terminal of the transistor 97. The forward signal F is applied to one input of another gate 123 within the memory means 103. The Count signal lead from the driving means 1 is connected to the other input terminals of the gates 121 and 123. The output terminals of the gates 121 and 123 are connected to the up-down counter 101. The up-down counter 101 is provided with eight output terminals which are connected to an OR gate 125. The OR gate 125 generates a logical signal at its output terminal when any one or more of the input signals applied thereto is at a logic one level. A Memory Count (MC) output signal from the gate 125 is applied to one input of a two input gate 127. The Forward signal F is applied to the other input of the gate 127. The output signal of the gate 127 is used as a "Hold" signal which is applied to a reset terminal of the up-down counter 101. The Memory Count Signal MC from the output of the gate 125 constitutes an output signal from the memory means 103 which is applied to a control means 129. In the control means 129, the Memory Count Signal MC is applied through a resistor 131 to a ommon point 133. The Forward signal F is also applied to the point 133 through a resistor 135. A resistor 137 connects the common point 133 with a terminal 139. A second start switching member 141 is ganged to the first start switching member 111 and selectively moves between the terminal 139 and another terminal 143. The switch 141 is connected to a terminal 144 which is arranged for connection to a power source B+. A switch 145 conditionally provides a conductive path or effective contact closure between the B+ supply potential and a terminal 147. The terminals 143 and 147 are connected together. The common point connection the terminals 143 and 147 is connected to a point connecting two terminals 149 and 151 of a double-pole double-throw (DPDT) switch. The remaining two terminals 153 and 155 of the DPDT switch are also connected together; the common point connecting the terminals 153 and 155 is connected to the collector of a transistor 157, the emitter terminal of which is connected to ground. The transistor or first switching means 157 conditionally provides a first effective contact closure between its collective base & /emitter terminals. The common point 133 is connected to the base terminal of the transistor 157. The double-pole double-throw switch includes movable members 161 and 163 which are connected to the M1 and M2 leads from the driving means 1. The movable members 161 and 163 are operated in response to an energization of a coil 165 to engage the terminals 151 and 153, respectively. When the coil 165 is de-energized, the switching members 161 and 163 are biased to engage the terminals 155 and 149, respectively. The coil 165 is connected between the supply potential B+ and the collector terminal of a transistor 167. The emitter terminal of the transistor 167 is connected to ground and the Reverse signal R is applied to its base terminal through a resistor 169. The switching members 161 and 163 together with the coil 165, the transistor 167 and the resistor 169, comprise a polarity reversing switching means for reversing the polarity of the Power signal applied to the motor 41. The movable switching members 113 and 141 both labelled "start," are ganged together for simultaneous movement in response to an operator actuation of a "start" switch (not shown). The movable switching members 87 and 145, both labelled "Reverse Limit," are ganged together for simultaneous movement in response to the lens means 3 tripping a limit switch (not shown) upon reaching the first limit position 5. The movable switching member 119 is labelled "Forward Limit" and actuated as the lens means 3 trips a limit switch (not shown) upon reaching the second limit position 7.

The operational goal of the automatic focusing system of the present invention is to automatically focus a lens system with respect to a scene to be photpgraphed thereby eliminating the need for an operator to manually perform the focusing function before taking a picture of a scene. The reverse limit switching members 87 and 145 in the present embodiment are actuated as the lens means 3 reaches the position 5 shown in FIG. 1. The first limit switching means or forward limit switch 119 is operated when the lens means 3 reaches the second portion 7 of FIG. 1. The coil 165 is initially assumed to be unenergized and switching members 161 and 163 of the double-pole, double-throw switch are therefore engaged with the terminals 155 and 149, respectively. Initially, it is assumed that the lens means 3 is in the position 5 (FIG. 1) and the first reverse limit switch member 87 is in engagement with the terminal 85 while the second reverse limit switch member 145 is open. The first and second reverse limit switching members 87 and 145 form a second limit switching means. When the start switch is not actuated, the first start switch member 113 is in the open position and the second start switch member 141 engages the terminal 139. The first-limit switching means or foward limit switch 119, which is operated by the lens means 3 when it reaches position 7, is shown in its normally open position, since the lens means 3 is initially assumed to be in position 5. When the operator actuates the start switch (not shown), the start switch member 113 of the direction signal generating means 105 closes and the start switch member 141 of the control means 129 is moved to the terminal 143. After the start switch members 113 and 141 are actuated by the operator, they will remain in the engaged position until after the lens means 3 is driven to the correct focus position and a picture of the scene to be photographed is taken, at which time the start switch members 113 and 141 will be released by the operator as is hereinafter explained.

At the beginning of an operational cycle, the Reverse signal R is at a logic 1 level; and therefore, the input terminals of the gate 115 are also held at a logic 1 level. When the start switch member 113 is closed, the existing logic 1 voltage is shorted to the logic 0 voltage, ground in the present example, through the capacitor 109. The input terminals of the gate 115 are then held at the logic 0 level for a short time delay while the capacitor 109 begins to charge toward the logic 1 level. The logic 0 applied to the input terminals of the gate 115 causes the forward signal F to go to a logic 1 or high level. When F goes high, the input terminals of the gate 117 also go high which, in turn, causes the reverse signal R to go low. F will go high and R will go low before the capacitor 109 is able to charge to the logic 1 level. When R goes low, the input terminals of the gate 115 are held low by the cross coupling from the output terminal of the gate 117. Therefore, when the operator actuates the start switch 113, the forward signal F goes high and the reverse signal R goes low. At the same time, the start switch member 141 engages the terminal 143 thereby connecting the B+ source potential to the terminal 149. If any one of the signals applied th rough the resistors 131, 135 or 137 to the common point goes high, the transistor 157 will be rendered conductive. Since after the start switch member 113 is is closed, F goes high, a logic 1 voltage level, which is approximately 5 volts in the present example, is applied through the resistor 135 to the common point 133 and the transistor 157 is rendered conductive. With the start switch member 141 engaging the terminal 143 and the transistor 157 conductive, an energizing circuit is completed thereby energizing the motor 41 through the leads M1 and M2. When the motor is energized, the motor shaft 45 begins to rotate the gear 49 and that rotational movement is imparted to the other gears 47, 51 and 53 within the gear box 43 (FIG. 3). The gear 53 will then begin to drive the lens means 3 from position 5 toward position 7. The gear 51 will drive the mirror 21 in the focus converter means 9. The gear 47 will rotate the circular disc 61; a pulsating Count signal, representative of the distance moved by the lens means 3, will appear at the Count output of the driving means 1, as was hereinbefore explained.

As the lens means 3 moves from position 5 to position 7, the Focus signal will be generated by the focus converter means 9 and applied to the signal responsive means through the connection 13. The Focus signal varies in magnitude with the degree of sharpness of the image appearing on the mask 31, as was hereinbefore explained. As the lens means 3 moves away from position 5, the second limit switching means or reverse limit switch member 87, in the peak detector circuit 77, will be moved to the terminal 83. The peak detector 77 will then begin to store the value of the Focus signal on the capacitor 89. If the focus signal is increasing in magnitude, the Focus signal applied to the negative terminal of the amplifier 93 in the comparator means 79 and the peak signal applied to the positive terminal of the amplifier 93 will be substantially equal and no difference signal will be applied from the amplifier 93 to the base terminal of the transistor 97. When no difference signal is applied to the base terminal of the transistor 97, the transistor 97 is non-conductive conductive and a logic 1 will appear on the Reset output of the comparator 79.

After the Focus signal reaches a peak and begins to decrease, the peak signal applied to the positive terminal of the amplifier 93 will be greater than the decreasing Focus signal applied to the negative terminal of the amplifier 93, therefore a difference signal will be applied to the transistor 97, rendering it conductive. When the transistor 97 is conductive, a logic 0 appears at the Reset output of the comparator 79. Therefore, when the focus signal is increasing, a logic 1 appears on the Reset line, but as soon as the Focus signal reaches a peak and begins to decrease, the Reset signal goes low, i.e., to a logic 0 level. With the Forward signal F at a logic 1 level, the gate 123 will be enabled, and the count signal applied to the gate 123 will be passed therethrough. The up-down counter 101 will then begin counting up the individual pulses in the Count signal. Each time the Focus signal reaches a new peak, the Reset signal line will go to a logic 1 level thereby resetting the count in the up-down counter 101 to 0.

When the lens means 3 reaches position 7 (FIG. 1), the forward limit switch 119 is actuated, thereby providing a first limit signal by connecting a logic 0 level to the input terminals of the gate 117 in the direction signal generating means 105. A logic 0 applied to the input terminals of the gate 117 forces the Reverse signal R to go high, i.e., to a logic 1 level, thereby applying a logic 1 level to the input terminals of the gate 115 causing the Forward signal F to go low. Therefore, when the lens means 3 reaches its forward limit 7, R will go high and F will go low. When R goes high and F goes low, gate 121 will be enabled and gate 123 will be disabled. Therefore, when the Reverse signal R goes high the Count signal generated by the count signal generating means 59 will be applied to the up-down counter 101 through the gate 12. When the count signal is applied to the up-down counter 101 through the gate 121, the up-down counter 101 begins to count down from the count stored during its up-counting cycle when the count signal was applied through the gate 123. When the Reverse signal R goes high, a logic 1 level is applied to the base terminal of the transistor 167 of the control means 129. When a logic 1 is applied to the base terminal of the transistor 167, it is rendered conductive thereby completing an energization circuit for the coil 165. When the coil 165 is energized, the switching members 163 and 161 are switched to the terminals 153 and 141, respectively, thereby changing the polarity of the signal applied to the motor 41 through the leads M1 and M2. When the polarity of the signal applied to the motor 41 through the leads M1 and M2 is reversed, the motor will stop and begin to rotate in a reverse direction. As the motor rotates in the reverse direction, the lens means 3 is driven from its forward limit position 7, toward its reverse limit, position 5. Since the up-down counter 101 is reset to 0 each time a new peak in the Focus signal is encountered during the lens movement from position 5 toward position 7, the output present in the counter 101 when the forward limit switch is tripped is representative of the distance between the position of the lens means 3 at which the image appearing at the mask 31 was best focused, and the forward limit position 7. When the Reverse signal R goes high, the transistor 97 is rendered conductive since a logic 1 voltage level is applied to the base terminal thereof through the resistor 120. When the transistor 97 is rendered conductive the Reset signal applied to the up-down counter 101 is held at a logic 0 thereby preventing the stored count in the up-down counter 101 from being reset by changes in the output of the amplifier 93 as the motor is driven in the reverse direction from position 7 toward position 5. When the count in the counter 101 is reduced to 0, the Memory Count signal goes to zero and the lens means 3 is in proper focus position for the particular scene to be photographed. During the forward movement of the lens means 3 toward position 7, the transistor 157 in the motor energization circuit is maintained in a conductive state since the Forward signal F remains at a logic 1 level. The energization circuit, including the transistor 157, is still maintained even when the F signal goes low, since the logic level of the Memory Count Signal MC applied to the base terminal of the transistor 157 through the resistor 131 will be high whenever any count is present in the counter 101. Whenever any count is present in the Counter 101, at least one of the input signals applied to the gate 125 will be at a logic 1 level and therefore, the output signal Memory Count MC of the gate 125 will also be a logic 1 level and the transistor 157 will be held conductive. However, as the lens means 3 moves in the reverse direction, the count in the counter 101 is counted down and when a zero count is present, none of the inputs to the gate 125 will be at a logic 1 level and its output MC will therefore go low to a logic 0 level. When the output of the gate 125, MC, goes to a logic 0 level which is representative of the fact that the lens means 3 has arrived at its focus position, the transistor 157 will be rendered non-conductive. When the transistor 157 is non-conductive the energization circuit for the motor 41 is effectively open circuited and the motor 41 will stop thereby stopping the lens means 3 at its proper focus position.

The operator will then depress the shutter switch of an associated camera and take a properly focused photograph of a selected scene. After the picture is taken, the photographer will then release the start switch whereupon the start switch member 113 will return to its normally open position and the start switch member 141 will break contact with the terminal 143 and return to its normal position contacting terminal 139. The opening of the start switch member 113 will cause no change in the F or R signals, but the switching of the start switch member 141 to the terminal 139 will provide a path to supply the requisite current from the B+ source through the resistor 137 to the base terminal of the transistor 157 to render the transistor 157 conductive thereby completing the energization circuit for the motor 41. Since the Reverse signal R has not changed and remains in the logic level the transistor 167 remains conductive and the motor will resume movement in the reverse direction. When the lens means 3 arrives at its reverse limit position 5, the first reverse limit switching member 87 will break contact with the terminal 83 and engage the terminal 85 thereby discharging the capacitor 89. At the same time, the second reverse limit switching member 145 will break contact with terminal 147 thereby opening the energization circuit to the motor 41 at which time the lens means will stop at its reverse limit position 5. The system is then ready for another operational cycle which is initiated by the engagement of the start switch as hereinbefore explained.

The primary function of the gate 127 in the memory means is to prevent the up-down counter from counting through zero when the lens is moving in the Reverse direction. When the lens means 3 reaches the proper focus position while moving in the reverse direction, the count in the counter 101 is zero and therefore the memory count signal MC goes low therby rendering the transistor 157 non-conductive and de-energizing the motor 41. Since the Forward signal is also at the low logic level, the Hold output signal of the gate 127 will go high. When the Hold signal goes high, the count in the counter 101 is maintained at zero and is unaffected by subsequently received pulses in the Count signal which may be generated, for example, due to the moving inertia of the motor. Therefore, when the count output of the up-down counter 101 is counted down to zero, the up-down counter 101 is held at the count zero until the Forward signal F again goes high in response to the initiation of another operational cycle.

In FIG. 5, an alternate arrangement of the signal responsive means 11 is shown. The operational elements of FIG. 5 which correspond in function to the operational elements hereinbefore explained in connection with FIG. 4, are shown in FIG. 5 bearing the same numeral designation as their counterparts in FIG. 4 with the distinction that the numeral designations are primed in FIG. 5.

The alternate signal responsive means 11' receives a Focus signal through the connection 13', and includes output leads M1' and M2' which are connected to a motor in a driving means by a connection means 15'. The Focus signal is applied to a switching member 171 within a memory means 103' included in the alternate signal responsive means 11'. The switching member 171 is operated by a coil 173 to move between two terminals 175 and 177. A first peak detector and hold circuit 183 is connected between the terminal 175 and one input of a comparator means 181. A second peak detector and hold circuit 179 is connected between the terminal 177 and a second input terminal of the comparator means 181. The comparator means 181 generates a Memory Count signal MC' which is similar in nature to the Memory Count Signal MC produced at the output of the gate 125 shown in FIG. 4. A direction signal generating means 105' generates a Forward signal F' and a Reverse signal R' in a manner similar to that in which the Forward signal F and the Reverse signal R are generated by the direction signal generating means shown in FIG. 4. The Forward signal F' is applied to the base terminal of a transistor 185. The emitter terminal of the transistor 185 is connected to ground while its collector terminal is connected through a coil 173 to a B+ source of potential. The Memory Count signal MC' along with the Forward signal F' and the Reverse signal R' are applied to a control means 129' which is similar to the control means 129 shown in FIG. 4. The control means 129' has output leads M1' and M2'.

Switching member 171 is normally connected to the terminal 175. After a previous operational cycle, the Forward signal F' is at a low logic level and the transistor 185 is held in a non-conductive state. While the transistor 185 is non-conductive, the coil 173 is not energized and switching member 171 remainds connected to the terminal 175. When an operator initiates an operational cycle by actuating a start switch, as hereinbefore explained in connection with FIG. 4, the Forward signal F' goes high thereby rendering the transistor 185 conductive and energizing the coil 173. When the coil 173 is energized, the switching member 171 moves into contact with the terminal 177. As was the case in FIG. 4, the peak detector and hold circuits 179 and 183 are discharged after every operational cycle. Therefore after each operational cycle both outputs of the peak detector and hold circuits 179 and 173 will be 0. As the lens is moved in the forward direction, the output from the peak detector and hold circuit 183 remains at 0 while the output of the peak detector and hold circuit 179 will increase in accordance with the peak values of the Focus signal applied thereto. Therefore, during the forward movement of the lens means 3, the Memory Count signal MC' will be at a logic 1 level. When the lens means 3 reaches its forward limit 7, the Forward signal F' will go low and the Reverse signal R' will go high. When the Forward signal F' goes low, the transistor 185 is rendered non-conductive and the coil 173 is de-energized. When the coil 173 becomes de-energized, the switching member 171 breaks contact with the terminal 177 and re-engages the terminal 175. As the lens means 3 moves from its forward limit position 7 toward its reverse limit position 5, the Focus signal generated by the focus converter means 9 will be applied to the first peak detector and hold circuit 183. When the value of the signal from the first peak detector and hold circuit 183 generated during the reverse movement of the lens means 3, equal the value of the signal present at the output of the second peak detector and hold circuit 179 which was generated during the forward movement of the lens means 2, the Memory Count signal MC' will go low. When the Memory Count signal MC' goes low, the movement of the lens means 3 will be terminated at the proper focus position. The operator may then take a picture of the scene being photographed. Thereafter when the operator disengages the start switch, the lens means 3 will return to its reverse limit position 5 as hereinbefore explained in connection with FIG. 4. It is here noted, that when the alternate signal responsive means 11' is used in the system, the count signal generating means 59, shown in FIG. 3 as part of the driving means 1, is not required, and the connection 15' contains only the leads M1' and M2'. It is further noted that any noise peaks in the Focus signal, less than the detected peak value at which the image is focused on the mask 31 will be disregarded by the present systen, since a complete traversal between focus limit stops 5 and 7 must occur before the lens means 3 is returned to its detected focus position.

Thus, there has been provided, in accordance with the present invention an improved automatic focusing system, which automatically so positions a lens that an image, formed on a predetermined plane from radiations passing through the lens from an external scene, appears in focus. The improved automatic focusing system is substantially insensitive to noise signals.

The embodiments of the invention in which an exlusive property or privilege is claimed, are defined as follows:

1. In an automatic focussing apparatus, the combination comprising:

lens means for passing radiations from a scene therethrough to form a single image of said scene on a single predetermined plane;

driving means;

first coupling means coupling said driving means with said lens means, said driving means being operable to effect movement of said lens means between first and second positions, thereby affecting the definition of said single image on said single predetermined plane;

light detection means responsive to the contrast definition of said single image for providing a data signal having a frequency characteristic which varies in accordance with said contrast definition of said single image;

signal conditioning means responsive to said frequency characteristic of said data signal for providing a focus signal which varies in magnitude with said contrast definition of said single image;

deflection means;

a second coupling means, said second coupling means coupling said driving means and said deflection means, said deflection means being operable to effect a relative scanning movement of said single image with respect to said single predetermined plane; and signal responsive means connected to said driving means, said signal responsive means being responsive to said focus signal for terminating movement of said lens means at a position whereat said focus signal attained a maximum value during the movement of said lens means between said first and second positions.

2. The combination as set forth in Claim 1 where in said deflection means further includes means for effecting said relative scanning movement at a constant rate.

3. In an automatic focusing apparatus, the combination comprising:

lens means for passing radiations from a scene therethrough to form an image of said scene on a predetermined plane;

driving means;

first coupling means coupling said driving means with said lens means, said driving means being operable to effect movement of said lens means between first and second positions, thereby affecting the definition of said image on said predetermined plane;

focus converter means responsive to the definition of said image on said image plane for generating a focus signal which varies in accordance therewith, said focus converter means including a deflection means and a second coupling means, said second coupling means coupling said driving means and said deflection means, said deflection means being operable to effect a relative scanning movement of said image with respect to said predetermined plane; and signal responsive means connecting said focus converter means and said driving means, said signal responsive means being responsive to said focus signal for terminating movement of said lens means at a position whereat said focus signal attained a maximum value during the movement of said lens means between said first and said second position, said signal responsive means including:

first start switching member selectively operable for providing a start signal;

signal generating means responsive to said start signal for providing first direction signal;

terminal means arranged to be connected to a power supply for supplying a power signal;

a power circuit connecting said terminal means to said driving means for applying said power signal to said driving means;

first switching means serially connected in said power circuit, said first switching means being responsive to said first direction signal for providing a first effective contact closure in said power circuit thereby completing said power circuit and effecting a movement of said lens means from said first position toward said second position;

memory means responsive to said focus signal for storing a signal representative of a focus position of said lens means during a movement of said lens means from said first toward said second position;

first limit switching means operatively coupled to said lens means for providing a first limit signal when said lens means reaches said second position, said signal generating means being responsive to said first limit signal for generating a second direction signal;

polarity reversing switching means connected in said power circuit, said polarity reversing switching means being responsive to said second direction signal for reversing the polarity of said power signal applied to said driving means, thereby effecting a movement of said lens means from said second position toward said first position;

said memory means including means for generating a memory signal whenever said lens means reaches said focus position in moving from said second position toward said first position, said first switching means being responsive to said memory signal for opening said effective contact closure in power circuit means thereby terminating the operation of said driving means, said lens means being thereby positioned at said focus position.

4. The combination as set forth in claim 3 wherein said signal responsive means further includes lens return means selectively operable for returning said lens means to said first position following said positioning of said lens mean at said focus position.

5. The combination as set forth in claim 4 wherein said lens return means includes:

a second start switching member serially connected in said power circuit, said second start switching member being operatively coupled to said first start switching member for simultaneous operation therewith for providing a second effective contact closure in said power circuit, said first and second effective contact closures thereby completing said power circuit and effecting said movement of said lens means from said first toward said second position;

second limit switching means providing a normally closed contact across said second start switching member, said second limit switching means being operatively coupled to said lens means for opening said normally closed contact when said lens means is in said first position, and means selectively operable for opening said second effective contact closure and re-establishing said first effective at said focus position whereby said second limit switching means and said second effective contact closure complete said power circuit thereby resuming the movement of said lens means toward said first position whereat said opening of said second limit switching means opens said power circuit and terminates said movement of said lens means.

6. The combination as set forth in claim 4 wherein said driving means includes a motor means, said first and second coupling means being coupled to said motor means, count signal generating means connected to said memory means, third coupling means operatively coupling said count signal generating means with said motor means, said count signal generating means being operable for providing a count signal characterized by a series of pulses, the number of said pulses generated in any given time period being related to the distance moved by said lens means during said time period, said signal responsive means further including a peak detector and hold circuit responsive to said focus signal for providing a peak signal representative of the peak value by said focus signal during a movement of said lens means from said first to said second position, and a comparator circuit connecting said peak detector and hold circuit and said memory means, said comparator circuit being responsive to said peak signal and said focus signal for providing a reset signal whenever said focus signal and said peak signal are substantially equal, said memory means including counting means responsive to said first direction signal for up-counting and storing said pulses of said count signal, said counting means being further responsive to said reverse signal for down counting said pulses from the number of said stored pulses, said counting means being responsive to said reset signal for resetting said stored count to zero and holding said stored count at zero during the continuance of said reset signal, said memory signal being generated whenever said count stored by said counting means equals zero during a movement of said lens means from said second position to said first position.

7. The combination as set forth in claim 6 wherein said memory means further includes means for holding said count in said counting means at zero during a concurrence of said memory signal and said second direction signal.

8. The combination as set forth in claim 4 wherein said memory means includes:

first peak detector and hold circuit;

second peak detector and hold circuit;

switching means normally connecting said focus connector means with said first peak detector and hold circuit, said switching means being responsive to said first direction signal for disconnecting said focus convertor means from said first peak detector and hold circuit and connecting said focus converter means to said second peak detector and hold circuit, said first and second peak detector and hold circuits being responsive to a receipt of said focus signal for generating first and second peak signals, respectively, representative of the peak value attained by said focus signal; and comparator means connected to said first and second peak detector and hold circuits said comparator means being responsive to a comparative equivalence of said first and second peak detector and hold circuits for generating said memory signal.

* * * * *